Sept. 28, 1965  H. HURVITZ  3,208,463
PURE FLUID AMPLIFIERS
Filed April 4, 1963

INVENTOR
HYMAN HURVITZ

BY Hurvitz & Rose
ATTORNEYS

United States Patent Office

3,208,463
Patented Sept. 28, 1965

3,208,463
PURE FLUID AMPLIFIERS
Hyman Hurvitz, 1313 Juniper St. NW., Washington, D.C.
Filed Apr. 4, 1963, Ser. No. 270,601
15 Claims. (Cl. 137—81.5)

The present invention relates generally to pure fluid amplifiers, and more particularly to pure fluid amplifiers wherein fluid jets are constrained to follow a generally circular or helical path about the axis of a hollow cylinder, internally thereof.

In pure fluid amplifiers as heretofore conceived, power jets of fluid are generally constrained to flow along linear paths, and the paths are diverted by applying transverse forces to the jets at one or a few points. Amplifiers of this type are relatively difficult to fabricate, since accurately machined and intricate passages are required, especially in multi-stage devices, such as might occur in computers and the like. They also have low amplification factors or power gains because the transverse forces are applied over only small parts of the paths of the jets. It would be advantageous if high gain pure fluid amplifiers could be fabricated without machining of complex channels, and involved only drilled holes in standard structural shapes. According to the present invention the standard structural shape is the pipe or cylindrical conduit, and the holes for ingress and egress of fluid are drilled generally tangentially of the inner surface of the pipe, and transversely of the axis of the pipe. Fluid injected into such a device via such an ingress aperture, or nozzle, is constrained to follow the inner wall of the pipe by centrifugal force, and also by boundary layer effect, the two effects cooperating.

Assuming that the jet follows a true circular path, any flow of fluid along the axis of the pipe will exert a force along the entire length of the jet and tend to force it to follow a helical path. Such axial flow can then be used as a control or input signal for the device. If the jet follows a helical path initially, instead of a true circular path, the helical pitch can be increased or decreased by the control flow, which continues to act along the entire length of the helix. The latter type of operation has the advantage of providing a very long path length for the jet, in a very small space, and for the effective application of control force along the entire path length, with consequent large amplification factor or power gain. Further, a large number of output apertures can be introduced, to pick off the rotating jet at any point along its helical path. Planar devices are generally reduced to two output apertures, or at most to three if proportional amplification is not needed. A helical flow amplifier can readily utilize more than three outputs, and since these can occur at any desired points along any possible paths of the fluid, there is provided the possibility of an adjustable delay time for input pulses.

The fact that the jet path can be made re-entrant or non-terminating, in a circular device, provides the property of energy storage, the device then simulating an electrical storage capacitor.

It is, accordingly, an object of the invention to provide a novel type of pure fluid amplifier.

It is another object of the invention to provide a system of pure fluid amplifier in which a jet of fluid is constrained to follow a circular path.

It is another object of the invention to provide a pure fluid amplifier in which a jet of fluid follows a helical path of variable pitch.

A further object of the invention resides in the provision of a pure fluid amplifier having input and output ports but no guide channels for the jets, thus simplifying construction.

It is still another object of the invention to provide a fluid amplifier having provision for applying transverse control force to a jet of fluid along its entire length.

It is a further object of the invention to provide a novel adjustable fluid delay line occupying only a small space for a long delay time.

It is another object of the invention to devise a fluid capacitor capable of storage of kinetic energy of flow, and occupying small space for a large capacity.

The above and still further objects, features and advantages of the present invention will become apparent upon consideration of the following detailed description of one specific embodiment thereof, especially when taken in conjunction with the accompanying drawings, wherein.

Figure 1:
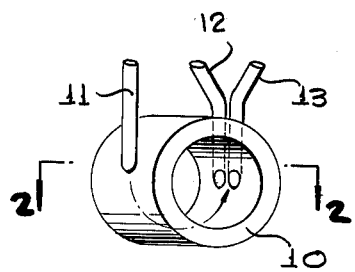
FIGURE 1 is a view in perspective of a cylindrical fluid amplifier according to the invention.
Figure 5:
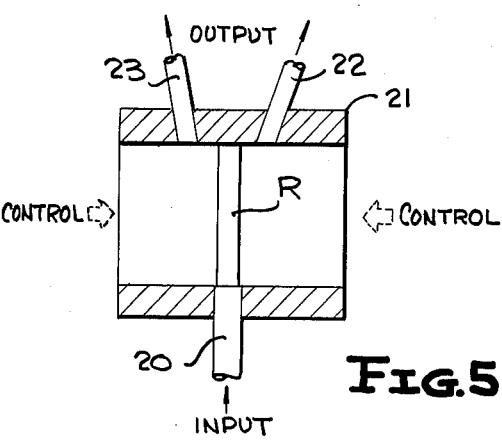
Figure 4:
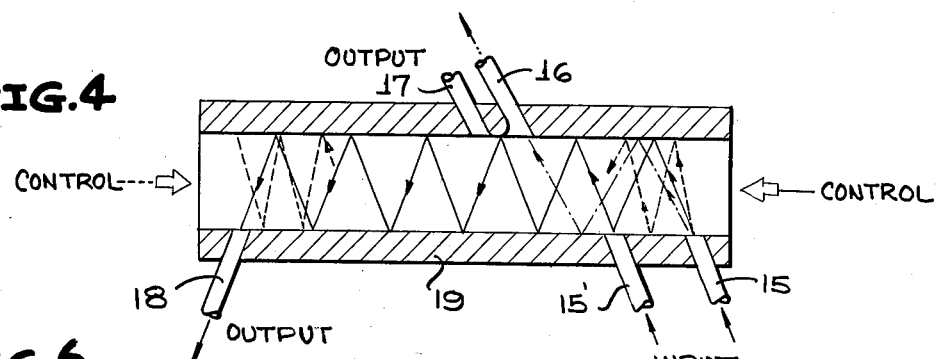
Figure 6:
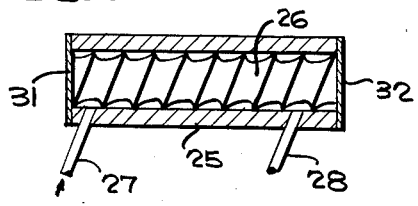

FIGURE 4 is a view in longitudinal section of a modification of the system of FIGURE 1, wherein a fluid jet follows a long or multi-turn helical path, capable of use as an amplifier or delay line; and FIGURE 5 is a view in perspective of a fluid energy storage device, analogous to a capacitor; and FIGURE 6 is a view in longitudinal section of a helical delay line employing a screw to constrain the fluid in one fixed path.

Referring now to the drawings, the reference numeral 10 denotes a section of cylindrical pipe having a fluid input port 11 drilled through its wall from exterior to interior and extending tangent to the inner surface and perpendicular to the axis of the cylinder. Two adjacent output ports 12, 13 are provided, of similar construction to port 11, and located largely on either side of the normal path of travel of the jet. Control fluid flows along the axis of the pipe 10, the ends of which are open, in either sense.

In operation fluid flows through port 11 at high pressure and enters the pipe 10 tangentially to its inner surface. It is then constrained by the inner wall of pipe 10 to follow a circular path, whereby centrifugal force is generated which maintains the fluid jet in contact with the inner wall. Control flow into either open end of pipe 10 provides a transverse force acting on the entire jet and serves to deflect the jet in the direction of the force, i.e. axially of the pipe. The output ports 12, 13, having a narrow separation, divide the jet when it is undeflected. Deflection of the jet relatively increases flow to one of the output ports 12, 13, to provide proportional amplification (FIGURE 3).

The system of FIGURE 4 is generally like that of FIGURE 1, with the basic difference that the input nozzle or port 15, is oriented to force the fluid jet into a helical path. The total distance along the jet from input port 15 to any of several output ports 16, 17, 18, along the length of pipe 19 can be very long even in a short pipe, by utilizing a small pitched helix. On the other hand, if the pitch is rather large the output ports may be relatively oriented so that only one can intercept the jet for any given pitch of the helix, and the others only for different pitches peculiar to each. Pitch can be modified by application of axial flow of control fluid. Since the transverse control force is applied along the entire length of the helix, and since path length is great, tremendous gains are available, when the device is considered as an amplifier. At the same time the device is a delay line in which long delay times, as for input pulses at nozzle 11, are achievable in a small space. A large number of output ports, say 10 or more, can be utilized, and these can be selected by varying helix pitch to provide readily adjustable delay times. The device can also be a proportional amplifier by properly placing a pair of output ports, 16, 17, differentially to receive the jet as the pitch of the helix increases and decreases. Parallel input can be made available as by placing a supplementary nozzle 15' at a position where its jet can add to the jet from nozzle 15.

In FIGURE 5 is illustrated a fluid capacitor. Fluid from input port 20 follows a circular path interiorly of pipe 21 but does not find an output port, hence the fluid flows in a circular re-entrant or non-terminating path or ring R, containing input port 20. Flow in the ring R is continuously increased, and a slight flow or trickle from nozzle 20 can in time result in a heavy flow of air in the ring or circle R. In due course this trickle will suffice only to make up loss of fluid from the ring, but at that time or before that time a control pulse applied axially of pipe 21 can deflect the flow to output port 22 or 23, and thus cause a rapid discharge of the fluid through one or the other of ports 22, 23. The slow build-up of flow and its rapid discharge, simulates the charge and discharge of an electrical capacitor in an RC oscillator.

Figure 2:
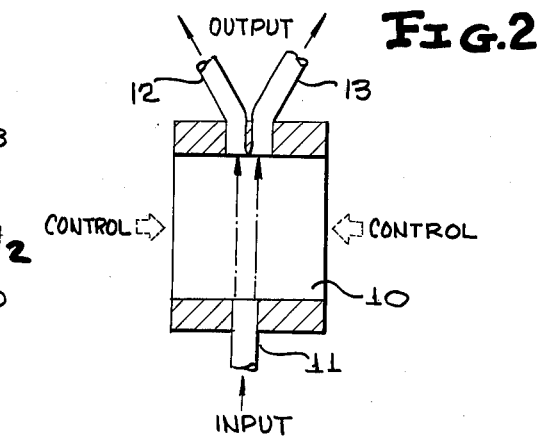
FIGURE 2 is a view taken in section on line 2—2 of FIGURE 1, with power jet undeflected.
Figure 3:
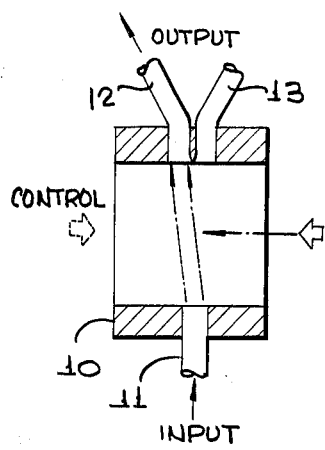
FIGURE 3 is a view corresponding to FIGURE 2, with power jet deflected.

If desired, the conduits or pipes of FIGURES 1–3 may be provided with central, axial, circular rods, spaced from the inner surface of the conduits, to constrain the fluid flow in the desired paths. This is not required where flow is sufficiently rapid, so that centrifugal force is great, but may be required for very slow flow, where centrifugal force may be inadequate to assure flow in the desired paths.

In FIGURE 6 is illustrated a delay line employing a tube 25 having internally thereof a screw 26. The outer diameter of the screw 26 fits the inner diameter of the tube 25, thereby forming a long helical channel internally of the tube. Fluid may be applied via inlet passage 27 and abstracted via outlet passage 28. The device thus provides a long delay, as for fluid pulses 30, in a small space. Since control jets are not needed the ends of tube 25 may be sealed off by end caps 31, 32.

While I have described and illustrated specific embodiments of my invention, it will be clear that variations of the details of construction which are specifically illustrated and described may be resorted to without departing from the true spirit and scope of the invention as defined in the appended claims.

What I claim is:

1. A pure fluid amplifier, comprising a cylindrical conduit, means for injecting a jet of fluid into said conduit in a direction having a component directed transversely of the axis of said conduit and substantially tangent to an inner surface of said conduit, whereby said jet of fluid travels a generally circular path only along said inner surface, at least one outlet aperture in the wall of said conduit located generally facing the path of said jet of fluid and means for controllably imparting force to said jet of fluid transversely of said path to deflect the path of said jet of fluid axially of said conduit.

2. The combination according to claim 1 wherein said conduit has throughout a smooth surface, said jet being unguided along its path along said inner surface.

3. The combination according to claim 2 wherein said force is imparted by a flow of fluid in the direction of the axis of said conduit.

4. The combination according to claim 3 wherein said path is a helical path of variable pitch according to the magnitude of said force.

5. The combination according to claim 3 wherein said at least one outlet aperture is a pair of closely spaced apertures, said jet of fluid dividing between said apertures according to the magnitude of said force to provide proportional amplification.

6. The combination according to claim 3 wherein said at least one output aperture is offset from the path of said jet, the undeflected jet having no available output aperture.

7. A fluid capacitor comprising a nozzle for fluid, means constraining fluid issuing from said nozzle to follow a re-entrant path, whereby fluid flowing along said path continuously re-enforces fluid flowing from said nozzle, and means for at will abstracting energy of flow from said re-entrant path.

8. A fluid delay line comprising a nozzle for issuing a jet of fluid, means constraining said jet of fluid to flow in a helical path having multiple turns, means for abstracting energy of flow from said helical path, and means for controllably varying the pitch of said helical path.

9. The combination according to claim 8 wherein is further provided plural exit apertures positioned selectively to collect fluid from said path according to the pitch of said helical path.

10. A pure fluid amplifier, consisting of a circular cylinder having a smooth inner wall, means for directing fluid in a generally circular path internally of said circular cylinder and following the contour of said circular cylinder, and means for controllably deflecting said fluid flow to have a variable axial component of flow while continuing to follow said contour.

11. A pure fluid device consisting of a circular cylinder having a smooth inner wall, means for directing fluid flow in a path around said cylinder internally thereof, said fluid being constrained to maintain contact with said cylinder by centrifugal force, and means applying a variable control fluid flow axially of said cylinder for controllably deflecting said fluid flow to have a variable axial component of flow, said inner wall being circular at all transverse cross-sections.

12. A pure fluid amplifier comprising a hollow cylinder having a cylindrical wall,
    a nozzle arranged to issue fluid into said hollow cylinder in a helical path extending along the inner surface of said hollow cylinder,
    and at least one collector opening located in said helical path in said cylindrical wall and arranged to collect fluid flowing tangentially of said wall for at least one pitch of said helix.

13. The combination according to claim 12 wherein is provided
    means for directing a control flow of fluid axially of said hollow cylinder at least along said wall to control the pitch of said helix.

14. The combination according to claim 13 wherein said at least one collector is at least three collectors spaced to collect said fluid differentially according to the pitch of said helix.

15. A pure fluid amplifier including
    first means arranged to issue a stream of fluid in a predetermined direction,
    at least two outlet ports located downstream of said first means,
    second means for transversely deflecting said stream of fluid to differentially direct said stream of fluid to said at least two outlet ports,
    a concave surface as seen from said first means for connecting said first means to said at least two outlet ports, said first means being arranged to issue said stream of fluid to flow tangentially of said concave surface, whereby centrifugal force maintain said stream of fluid in contact with said concave surface.

References Cited by the Examiner

UNITED STATES PATENTS

| | | | |
|---|---|---|---|
| 1,065,239 | 6/13 | Gudeman et al. | 138— 42 X |
| 1,381,095 | 6/21 | Starr | 239—468 |
| 1,402,784 | 1/22 | Moore | 251—127 X |
| 2,942,684 | 6/60 | Bennett | 181—58 |

FOREIGN PATENTS

| | | |
|---|---|---|
| 561,425 | 8/58 | Canada. |
| 571,204 | 1/24 | France. |

M. CARY NELSON, *Primary Examiner.*

LAVERNE D. GEIGER, *Examiner.*